June 27, 1967   E. SINGER   3,328,680
MAGNETIC DETECTOR FOR SENSING THE PROXIMITY
OF A METALLIC OBJECT
Filed Sept. 11, 1964   2 Sheets-Sheet 1

INVENTOR
*Edwin Singer*
BY
*Blair and Buckles*
ATTORNEYS

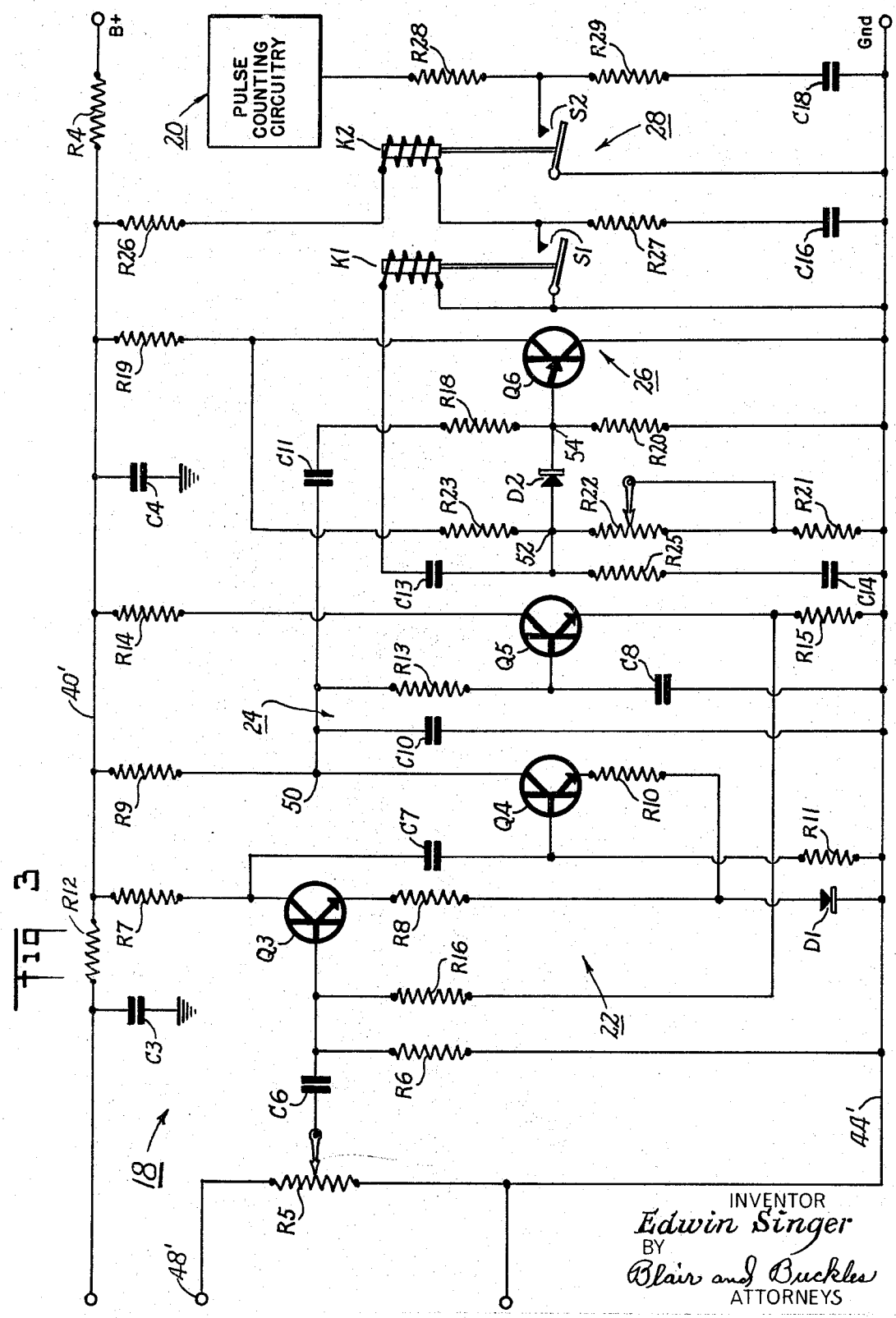

United States Patent Office 3,328,680
Patented June 27, 1967

3,328,680
MAGNETIC DETECTOR FOR SENSING THE
PROXIMITY OF A METALLIC OBJECT
Edwin Singer, Stamford, Conn., assignor to Hancock Telecontrol Corporation, Old Greenwich, Conn.
Filed Sept. 11, 1964, Ser. No. 395,685
12 Claims. (Cl. 324—34)

The present invention relates to a proximity sensor. More particularly, it relates to a system for detecting the presence of objects and providing a usable output signal indication in response thereto.

This invention has particular but not limited application where it is desired to provide for an accounting of the quantity of products or product parts produced in a manufacturing process.

A wide variety of techniques have been used in the past to achieve this end. These techniques can be grouped under two general classifications depending upon how the presence of an object is detected.

Under one classification are the "contacting type" sensors where the kinetic energy of the object is used to activate the detector. Typically, these contact type sensors take the form of a switch whose operating member is disposed in the path of moving objects. Each object operates the switch to provide a contact closure as the output manifestation of the presence of the object. A series of objects will then produce a series of contact closures which are counted by suitable circuitry.

The principal drawback of this technique is that, in many instances, the kinetic energy of each object is insignificant to operate the switch and produce the necessary contact closure. This is particularly true when the objects to be counted are of small physical size.

The other classification includes those sensors which are of the "non-contacting" type. Among these are sensors utilizing optical, capacitive and inductive phenomena in detecting the presence of objects. Although sensors of this general type are reasonably satisfactory for detecting small objects, they are found to be quite expensive to instrument, frequently sensitive to environmental changes and difficult to implement.

Another problem resides in providing a sensor for detecting individual parts coming in rapid succession. The detector must be capable of recovering in short order after detecting one object so as to be able to detect the next object. Similarly, the circuitry operating to process the proximity pickup signals from the detector into a usable output signal indication to be counted must also operate rapidly and have a short recovery time.

It is accordingly an object of the present invention to provide a sensor capable of detecting objects of relatively small physical size.

An additional object is to provide a non-contacting type sensor of the above character which is substantially insensitive to environmental conditions, of simplified construction and relatively inexpensive to manufacture.

A further object is to provide a sensor of the above character which is capable of detecting individual objects moving at a wide range of speeds and coming in rapid succession.

A still further object is to provide a sensor of the above character which includes a novel proximity detector.

An additional object is to provide a proximity sensor of the above character which includes a reliable circuit means for processing proximity pickup signal indications into output signal indications suitable to being counted.

The invention accordingly comprises the features of construction, combination of elements, and arrangement of parts which will be exemplified in the construction hereinafter set forth, and the scope of the invention will be indicated in the claims.

For fuller understanding of the nature and objects of the invention, reference should be had to the following detailed description taken in connection with the accompanying drawings in which:

FIGURE 3 is a detailed circuit schematic diagram of a circuit constructed according to the invention for processing proximity pickup signals developed by the detector of FIGURE 2.

Figure 1:
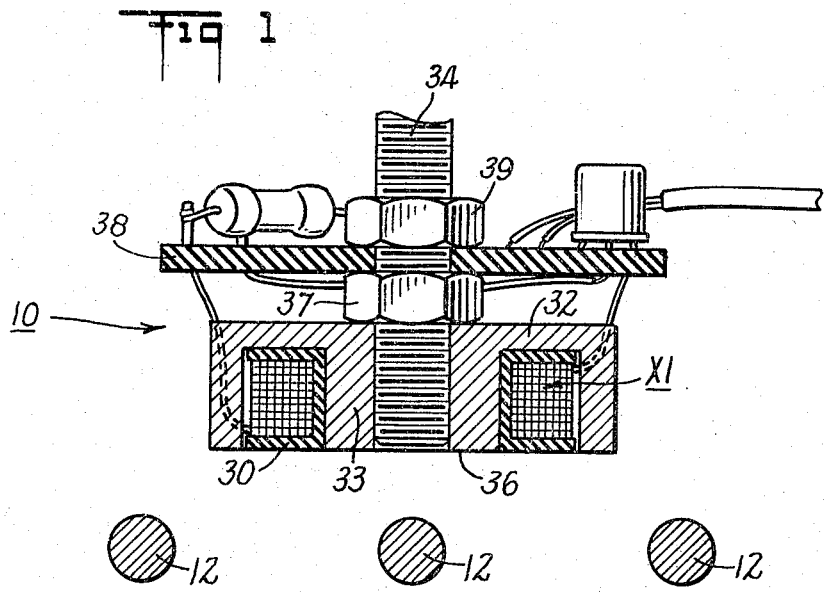
FIGURE 1 is a side elevational view in cross-section of a proximity pickup head constructed in accordance with the invention.

Broadly stated, the invention provides a proximity pickup head, generally indicated at 10 in FIGURE 1, which serves to focus a magnetic field in the path of moving objects indicated at 12. The magnetic field of the pickup head 10 tightly couples the primary and secondary windings of a transformer, indicated generally at X1 and carried by the pickup head.

Figure 2:
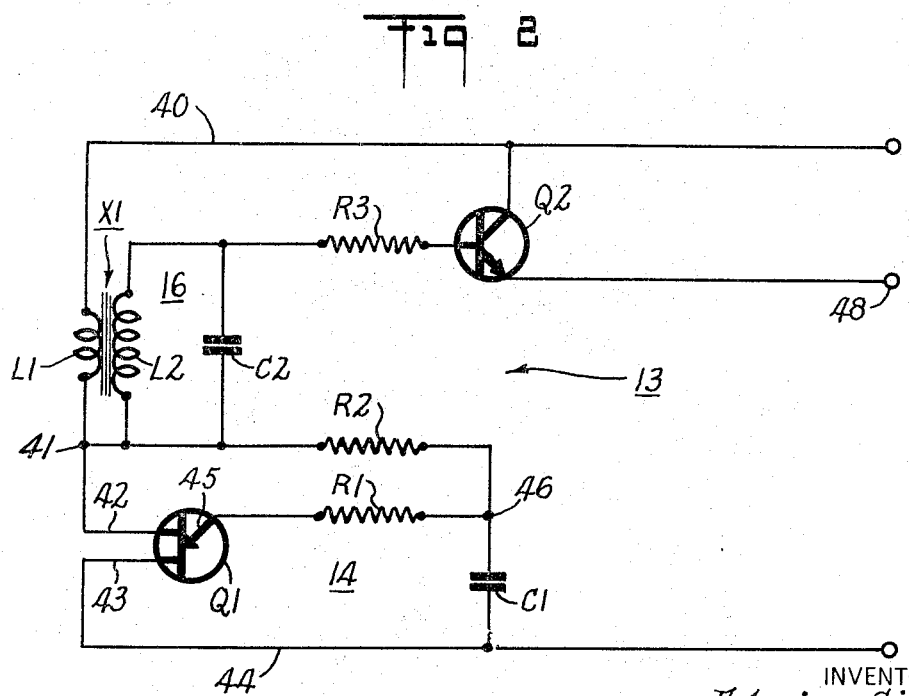
FIGURE 2 is a detailed schematic circuit diagram of a proximity detector constructed according to the invention and incorporating the pickup head of FIGURE 1.

Turning to FIGURE 2, a proximity detector circuit, generally indicated at 13, includes the pickup head 10 of FIGURE 1 with the transformer X1 having a primary winding L1 and a secondary winding L2. The primary winding L1 is periodically energized by a free-running, sawtooth oscillator, indicated generally at 14 to develop the magnetic field at the pickup head 10. This periodic energization excites a tuned circuit, generally indicated at 16 and formed by the secondary winding L2 of the transformer X1 and a capacitor C2, to produce a secondary sine wave. A portion of this sine wave is coupled back into primary winding L1 to synchronize the oscillator 14 to the natural resonant frequency of the tuned circuit 16.

When a metallic object enters the magnetic field developed by the pickup head 10, eddy currents are induced in the object causing an eddy current loss. This eddy current loss decreases the amplitude of the secondary sine wave developed by the tuned circuit 16.

Referring to FIGURE 3, a readout circuit, generally indicated at 18, responds to the sine wave output from the detector 13 of FIGURE 2 and produces output pulses, which are fed to pulse counting circuitry indicated at 20. The circuitry 20 can include conventional electro-mechanical or electronic pulse counting circuits to accumulate and register the number of pulses received and thus provide an indication of the quantity of objects which have passed through the magnetic field of the pickup head 10.

The sine wave output from the detector 13 is amplified in a class C feed-back amplifier, indicated generally at 22. Amplitude variations of this amplified sine wave, resulting from the passage of metallic objects 12 through the magnetic field of the pickup head 10 (FIGURE 1), are detected by a demodulator generally indicated at 24 in FIGURE 3. The output signals from the demodulator 24 trigger a one-shot pulse generator, signal stretching device, generally indicated at 26, which provides a pulse output for each passage of a metallic object 12 through the magnetic field of the pickup head 10. Each pulse output is stretched by pulse stretching circuitry, generally indicated at 28, providing a pulse of suitable time span to be counted by the pulse counting circuitry 20.

Returning to FIGURE 1 for a consideration of the invention in greater detail, the primary winding L1 and secondary winding L2 of the transformer X1 are wound on a nylon bobbin 30 in overlying, tightly coupled fashion. The bobbin 30 is fitted in a circular ferrite pot core 32 having a center piece 33 serving to properly focus the magnetic field developed by the pickup head 10.

A stud bolt 34, threaded into the center piece 33 of the core 32, serves to mount the pickup head 10 in close proximity to the objects 12 which pass by the face 36 of the pickup head. In practice, the objects 12 may be carried on a conveyor belt or passed down a chute or ramp depending upon the nature of the objects and the particular manufacturing process involved. A nut 37 threaded on the stud bolt 34 serves to space and mount a circuit board 38 relative to the core 32. A second nut 39 threaded down on the stud bolt 34 against the top of the circuit board 38 serves to hold the circuit board rigidly in place.

The circuit board 38 mounts the various electrical components of the detector circuit 13 of FIGURE 2. It is preferred to mount these circuit components in close proximity to the pickup head 10 so as to reduce the amount of stray capacitance and lead pickup inevitably associated with long electrical leads.

The particular geometry of the pickup head 10 may vary considerably depending upon the object size, the spacing of the objects, and the positional relationship between the pickup head and the objects. The particular pickup head configuration shown in FIGURE 1 is therefore merely illustrative.

Turning to the detector 13 of FIGURE 2 one side of the primary winding L1 of the transformer X1 is connected to a B+ voltage appearing on line 40. The other side of primary winding L1 is connected to a junction 41. A unijunction transistor Q1, the active element of the sawtooth oscillator 14, has its base two terminal 42 connected to junction 41 and its base one terminal 43 connected to ground appearing on line 44. The emitter 45 of the unijunction transistor Q1 is connected through a resistor R1 to a junction 46. Junction 46 is coupled to ground by a timing capacitor C1 and is also connected through a resistor R2 to junction 41. One side of the secondary winding L2 of the transformer X1 is connected to junction 41 while its other side is connected through a resistor R3 to the base of an emitter-follower transistor Q2. A capacitor C2 connected cross the secondary winding L2 cooperates with the secondary winding to form the tank circuit 16. The collector of the emitter-follower transistor Q2 is connected to B+ appearing on line 40 while its emitter is connected directly to a detector output terminal 48.

In the operation of the detector 13 of FIGURE 2, the timing capacitor C1 charges toward B+ through the primary winding L1 and the resistor R2. As long as the voltage at the emitter 45 is below a predetermined threshold voltage, typically 60% of the voltage across the base terminals of the unijunction transistor Q1, the circuit impedances between the various terminals of the unijunction transistor are extremely high. Once this threshold voltage is exceeded, the unijunction transistor 21 breaks down such that the impedance between the emitter 45 and base one terminal 43 suddenly becomes negligible while the impedance between base one terminal 43 and base two terminal 42 drops to approximately one-half its former value.

Thus, as the voltage across the charging capacitor C1 exceeds this threshold voltage, the unijunction transistor Q1 breaks down allowing the capacitor to discharge through the emitter-base one circuit of the unijunction transistor. During the period when the unijunction transistor is broken down or "on," it becomes a source developing a current drive pulse through the primary winding L1 of the transformer X1. The resulting current induced in the secondary winding L2 excites the tuned circuit 16 which then generates a secondary sine wave having a frequency determined by the parameters of the tuned circuit.

Once the discharging current from the capacitor C1 through the emitter-base one circuit of the unijunction transistor Q1 falls below a predetermined "holding current" value, the unijunction transistor regains its high impedance characteristics. As a consequence, the timing capacitor C1 again starts charging toward B+ on line 40. The length of time that the unijunction transistor Q1 is in the "on" state is largely determined by the value of resistor R1. The value of resistor R2 primarily determines the time duration that the unijunction transistor Q1 is in its high impedance or "off" state. It will be seen that this operation of unijunction transistor Q1 is self-perpetuating thus constituting the free-running oscillator 14. This oscillator generates a sawtooth wave having alternating exponential rises and falls.

For the purpose of illustrating the invention it will be assumed that the natural frequency of the tank circuit 16 is 20,000 cycles per second. Accordingly, the period of oscillation of the secondary sine wave is 50 microseconds. The primary winding drive current pulse developed when the unijunction transistor Q1 is in its "on" state is established to have a duration of approximately 10 microseconds, determined by appropriate selection of resistor R1. Accordingly the duration of the drive pulse is only one-fifth of the natural periods of the secondary sine wave. In this manner, the oscillator 14 is effective to develop the secondary sine wave in the tank circuit 16.

The value of the resistor R2 is selected so that the unijunction transistor Q1 will fire at optimum point in each cycle of the secondary sine wave so as to sustain this oscillatory signal in the tank circuit 16 at substantially constant amplitude. The instant in which the unijunction transistor Q1 is fired is generally chosen to occur at about the center of the positive-going swing of the secondary sine wave. However, in some cases it may be shifted as much as +⅛ of a cycle to increase the signal amplitude of low output secondary windings or as much as −⅛ of a cycle to decrease the signal amplitude of high output secondary windings.

In order to synchronize the firing of the unijunction transistor Q1 and thus the oscillator 14 to the natural frequency of the tank circuit 16, a portion of the secondary sine wave voltage is coupled back into the primary winding L1. This coupled back voltage which appears on the base terminal 42 of the unijunction transistor Q1 as a sine wave 180° out of phase with the secondary sine wave.

It will be recalled that the unijunction transistor Q1 will fire when its emitter voltage rises to a value which is approximately 60% of the voltage across its base terminals. Thus the unijunction transistor can be fired by raising the emitter voltage or decreasing the voltage across its base terminals.

Accordingly, if the resistor R2 is chosen such that the oscillator 14 would normally oscillate at a frequency slightly less than the frequency of the tank circuit 16, the capacitor C1 will have charged to voltage slightly less than the necessary threshold voltage when this coupled back voltage appearing on the base two terminal 42 is negative-going. This reduces the voltage across the base terminals to the extent necessary to fire the unijunction transistor Q1 prematurely but rather precisely at the optimum point in the secondary sine wave, i.e. when the secondary sine wave is positive-going. Accordingly, the coupled back voltage from the tank circuit 16 will serve to synchronize the oscillator 14 to the frequency of the tank circuit. This synchronization is maintained despite drifting of the tank circuit resonant frequency due to component aging and variations in temperature.

At standby, the amplitude of the secondary sine wave remains substantially constant in amplitude since it is being periodically reinforced by the drive pulse developed by the oscillator 14. When a metallic object enters the magnetic field developed by the pickup head 10, eddy currents are induced in the object and the associated eddy current losses are reflected in a decrease in the amplitude of the secondary sine wave. Accordingly, this decrease in secondary sine wave amplitude becomes an indication of the presence of a metallic object in the magnetic field of the pickup head 10. The duration of this amplitude reduction may vary from 10 to 100 milliseconds depending on the object size and the speed of its passage through the magnetic field.

The secondary sine wave developed by the tank circuit 16 is applied to the base of the emitter-follower transistor Q2 through the resistor R3 which serves to isolate the tank circuit from this transistor and to establish the D.C. operating level for this transistor. The emitter-follower transistor Q2 serves as a power amplifying and impedance matching device for the readout circuit 18 of FIGURE 3. The secondary sine wave appearing on the emitter of the transistor Q2 is applied to the detector output terminal 48 which is common to circuit input terminal 48′ seen in FIGURE 3.

Referring jointly to FIGURES 2 and 3, the B+ line 40 and the ground line 44 of the detector 13 are common to the B+ line 40′ and ground line 44′ of the readout circuit 18. Line 40′ is connected through a resistor R4 to a suitable B+ supply. A capacitor C3 connected to ground and a resistor R12 connected in line 40′ serve to decouple the B+ supply from the detector 13. Similarly, a capacitor C4 connected from line 40′ to ground decouples the amplifier 22 from the B+ supply.

The secondary sine wave appearing at input terminal 48′ is developed across a potentiometer R5. A portion of the secondary sine wave voltage is tapped from the potentiometer R5 and A.C. coupled through a capacitor C6 to the base of a transistor Q3. The base of transistor Q3 is returned to ground through a resistor R6 while its collector is connected to the B+ line 40′ through a load resistor R7.

The emitter of transistor Q3 is connected to ground through a resistor R8 and a diode D1. The collector of transistor Q3 is A.C. coupled through a capacitor C7 to the base of a transistor Q4. The collector of transistor amplifier Q4 is connected to the B+ line 40′ through load resistor R9 while its emitter is connected through a resistor R10 and the diode D1 to ground. The base of transistor Q4 is returned to ground through a resistor R11.

In the portion of the readout circuit 18 thus far described, transistors Q3 and Q4 form the cascaded amplifier 22 for the input secondary sine wave from the detector 13. The diode D1 develops the required voltage to overbias these two transistor amplifier stages for class C operation. In standby operation, the potentiometer R5 is adjusted such that transistor Q3, normally biased off by the diode D1, will conduct only on the positive peaks of the input sine wave. The output of transistor Q3 will then be in the form of negative-going pulses generated across the collector load resistor R7 corresponding to the input positive peaks. Emitter resistor R8 provides a D.C. stabilization for this transistor.

The signals on the collector of transistor Q3 are A.C. coupled through capacitor C7 to the base of transistor Q4, which is also normally cut off by the bias voltage developed by diode D1. Because of the clipping of the first amplifier stage consisting of transistor Q1 and the capacitive coupling of the output to the second stage, the signal wave form at the base of transistor Q4 is asymmetrical with relatively narrow negative-going peaks as compared to much broader positive swings. Transistor Q4 will conduct on these broad positive peaks. The potentiometer R5 can be adjusted to establish, at standby, a suitable average D.C. voltage level at a junction 50 between resistor R9 and the collector of transistor Q4.

This average D.C. voltage level at junction 50 is applied through a resistor R13 to the base of an emitter-follower transistor Q5. The collector of transistor Q5 is connected to the B+ line 40′ through resistor R14 while its emitter is returned to ground through a resistor R15. The base of this transistor is coupled to ground through a capacitor C8. The emitter of transistor Q5 is also connected through a resistor R16 back to the base of the input transistor Q3.

This feedback circuit embodying emitter-follower transistor Q5 controls the gain of the first amplifying stage by providing the base current to transistor Q3 through the resistor network of resistors R6 and R16. If, due to component aging, the secondary sine wave from the detector 13 decreases in amplitude, it is reflected in a smaller peak to peak input to transistor Q4. The average D.C. level at junction 50 will therefore rise. This voltage rise will cause the emitter-follower transistor Q5 to generate additional base current to transistor Q3 increasing the gain of the first amplifying stage. This increase in first stage gain will thereby offset most of the decrease in the amplitude of the secondary sine wave. Moreover, this feedback circuit will compensate for normal aging of the components in the amplifier 22 itself.

Similarly, but in a much more rapid fashion, the amplitude of the secondary sine wave will decrease when a metallic object enters the magnetic field of the pickup head 10. As a result, the voltage level at junction 50 will increase rapidly. The resistor R13 and capacitor C8 in the base circuit of the emitter-follower transistor Q5 function as a delay to prevent the automatic gain control circuit from operating to adjust the gain of the input amplifier stage in response to proximity pickup signal indication. As a consequence, the automatic gain control operates only to compensate the amplifier gain for gradual variations in the voltage level at junction 50.

Still considering FIGURE 3, a demodulating capacitor C10 is connected between junction 50 at the collector of transistor amplifier Q4 and ground. Capacitor C10 is constantly being charged through resistor R9. During standby operation, transistor Q4 conducts to partially discharge capacitor C10. Consequently, this capacitor maintains the average D.C. voltage level at junction 50. A decrease in the sine wave amplitude serving as a proximity pickup indication renders transistor Q4 ineffective to discharge capacitor C10 and the voltage at junction 50 rises rapidly in accordance with the time constant of the RC circuit of capacitor C10 and resistor R9.

A series circuit including capacitor C11 and resistor R18 A.C. couples junction 50 to the one-shot pulse generator 26. A rise in the voltage level at junction 50 is applied to the emitter of a unijunction transistor Q6. The base two terminal of unijunction transistor Q6 is connected to the B+ line 40′ through a resistor R19 while its base one terminal is tied directly to ground. Its emitter is also connected to ground through a resistor R20. A potential divider consisting of resistor R21, variable resistor R22, and resistor R23 is connected across the base terminals of unijunction transistor Q6.

Variable resistor R22 is adjusted to establish a positive standby voltage level at a junction 52 which is applied through a diode D2 to a junction 54 common to resistors R18, R20 and the emitter of unijunction transistor Q6. A capacitor C13 and a relay operating coil K1 are connected in series between the junction 52 and ground. A series resistor R25 and a capacitor C14 are also connected from junction 52 to ground.

Relay contacts S1 operated by relay coil K1 are connected in the energizing circuit for a second relay operating coil K2. One side of the relay coil K2 is connected through a resistor R26 to B+ line 40′ while the other side is connected through relay contacts S1 to ground. A series RC circuit consisting of a resistor R27 and a capacitor C16 is connected across the relay contacts S1.

In similar fashion, relay contacts S2 operated by relay coil K2 are connected in the input circuit of the pulse counting circuitry 20. The input to the pulse counting circuitry 20 is connected through a resistor R28 and relay contacts S2 to ground while a capacitor C18 and resistor R29 are connected in series across relay contacts S2.

Still referring to FIGURE 3, the operating characteristics of the unijunction transistor Q6 correspond to those of the unijunction transistor Q1 of FIGURE 2. In the application of FIGURE 3, however, the circuitry associated with the unijunction transistor is adjusted such that it will not run free. Rather, this unijunction operates as a one-shot pulse generator. Variable resistor R22 is adjusted to establish the charge level for capacitors C13 and C14 at a voltage which, when applied through diode D1 to junction 54, is slightly below the threshold voltage required to fire the unijunction transistor Q6. Diode D1 serves also to isolate the low impedance network connected to its anode from the relatively high impedance driving source of resistor R9.

As previously described, the secondary sine wave developed by the detector 13 decreases in amplitude on detection of a metallic object. This causes a rapid increase in the D.C. voltage level at junction 50. This positive rise is A.C. coupled through capacitor C11 and resistor R18 to junction 54 at the emitter of unijunction transistor Q6 causing the threshold voltage to be exceeded. With the threshold voltage exceeded, the unijunction transistor Q6 breaks down, permitting the capacitors C13 and C14, which had charged to the voltage level established by the variable resistor R22 and resistor R21 from the B+ supply, to discharge through the diode D2 and the emitter-base one circuit of the unijunction transistor. As capacitor C13 discharges, current is drawn through the relay coil K1 operating this relay.

It is found however, that since the relay coil K1 is an inductance, the initial discharging current is not sufficient to hold the unijunction transistor Q6 on after it has once been fired. The provision of capacitor C14 and resistor R25 connected in parallel with capacitor C13 and relay coil K1, due to the more rapid discharge of capacitor C14, furnishes sufficient starting current to hold the unijunction transistor Q6 on until the discharging current in the circuit branch including the relay coil K1 builds up to a sufficient magnitude to hold the unijunction transistor on and, at the same time, operate the relay.

Once capacitors C13 and C14 are substantially discharged, relay contacts S1 drop out and unijunction transistor Q6 extinguishes. Capacitors C13 and C14 then recharge to the voltage level established at junction 52. The closure of relay contacts S1 provides the output pulse from the one-shot pulse generator 26.

The placement of the relay coil K1 in the circuit of the one-shot pulse generator 28 is quite important. Typically, the base one-base two circuit is the output circuit of a unijunction transistor. It would therefore naturally follow that the relay coil K1, being the output device, should be connected in the base one circuit of unijunction transistor Q6. It was found that, using fast-operating reed relays, the leakage current through the base two-base one circuit of the unijunction transistor and the relay operating coil would likely prevent the relay, once operated, from dropping out. Moreover, the inductance of the relay coil inhibited the rapid build-up of starting current to initially hold the unijunction transistor on. By connecting the relay coil K1 in the emitter circuit of the unijunction transistor Q6, reliable operation is achieved. Since the relay coil K1 is in series with the capacitor C13, the current in this circuit branch has to fall to zero, causing the relay to drop out, once the capacitor is fully charged. Further, the parallel capacitor C14 supplies the starting current as previously described.

In the meantime, the closure of contacts S1 due to energization of relay coil K1 causes energization of the relay coil K2. During this period, capacitor C16 discharges through the closed relay contacts S1. Then when relay contacts S1 drop out, energization of relay coil K2 is continued while capacitor C16 is charged. Once capacitor C16 is fully charged, relay coil K2 is de-energized and its associated contacts S2 in the input circuit to the pulse counting circuitry 20 drop out also. In this manner, the output pulse developed by the closure of contacts S1 is stretched in time so as to provide an input pulse of sufficient time duration to operate the pulse counting circuitry 20. By so doing, electro-mechanical pulse counters may be used in the circuitry 20 to register the count of the number of metallic objects passing through the magnetic field of the pickup head 10.

In practice, a proximity sensor constructed in accordance with the invention is capable of resolving nine to eleven pulse counts per second using conventional electro-mechanical pulse counting circuitry. Accordingly, metallic objects can be counted at a rate as high as nine to eleven per second. However, this range can be increased to a greater extent by using electronic pulse counting circuitry.

The pickup head 10 can be of convenient size so as to be readily oriented into optimum spatial relationship with the particular metallic objects being detected. Quarter inch diameter objects, moving at a rate as high as sixty miles per hour, are detected by the pickup head 10 with great sensitivity. The proximity sensor has been tested for satisfactory operation over a temperature range from −20° to +80° centigrade.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described the invention, what is claimed as new and desire to secure by Letters Patent is:

1. A proximity detector of metallic objects comprising, in combination:
 (A) a pickup head including
  (1) a transformer having
   (a) primary and
   (b) secondary windings,
   (c) said primary and secondary windings being wound in overlying relationship on said pickup head, and
  (2) centrally disposed magnetic material focusing a magnetic field tightly linking said primary and secondary transformer windings,
  (3) said pickup head being positioned to dispose said magnetic field in the path of travel of said objects;
 (B) a sawtooth oscillator for periodically driving said primary transformer winding so as to develop said magnetic field, said sawtooth oscillator including
  (1) a unijunction transistor having
   (a) a first base terminal connected to said primary transformer winding
   (b) a second base terminal, and
   (c) an emitter terminal,
  (2) a first resistor connected between said emitter terminal and a first junction,
  (3) a second resistor connected from said first junction to said first base terminal, and
  (4) a timing capacitor connected from said first junction to said second base terminal,
   (a) said capacitor being repetitively charged and discharged to successively fire said unijunction transistor;
 (C) a tank circuit formed by
  (1) a capacitor connected in circuit with said secondary transformer winding,
  (2) said tank circuit developing an oscillatory signal in response to the driving of said primary transformer winding by said oscillator,
   (a) a portion of said oscillatory signal being coupled back to said primary transformer winding to appear on said first base terminal so as to synchronize said oscillator to the frequency of said oscillatory signal;
 (D) whereby a metallic object passing through said magnetic field modulates said oscillatory signal to provide an indication of the proximity of a metallic object.

2. The device defined in claim 1 wherein (B)(3)(a) said second resistor has a resistance value such that the time said unijunction transistor is fired to pulse said primary transformer winding occurs at about the center of each positive-going swing of said oscillatory signal and (B)(2)(a) said first resistor has a resistance value such that said unijunction transistor drives said primary transformer winding for a duration equal to approximately one-fifth the period of said oscillatory signal.

3. The device defined in claim 2 wherein said oscillatory signal has a sinusoidal wave form and the amplitude of said sinusoidal wave is decreased as a metallic object passes through said magnetic field.

4. A system for detecting the proximity of metallic objects, said system comprising, in combination:
   (A) a detector for
      (1) developing a magnetic field disposed in the path of travel of said metallic objects, and
      (2) providing a first output signal at standby and a second output signal in response to the passage of a metallic object through said magnetic field;
   (B) amplifier means for amplifying said first and second output signals, said amplifier means including
      (1) at least two cascaded transistor amplifying stages;
   (C) a demodulating capacitor connected to an output terminal of said amplifier means, said capacitor
      (1) functioning to hold the voltage at said output terminal at a standby level in response to said first output signal and to increase said voltage in response to said second signal;
   (D) an automatic gain control circuit connected to said output terminal of said amplifier means and operating to control the gain of at least one of said amplifying stages so as to maintain said standby voltage level substantially constant;
   (E) a pulse generator A.C. coupled to said output terminal of said amplifier means, said pulse generator including
      (1) a unijunction transistor operating in response to a voltage rise at said output terminal to develop a controlled output pulse in response to each passage of an object through said magnetic field; and
   (F) pulse counting circuitry for accumulating controlled output pulses.

5. A system for detecting the proximity of metallic objects, said system comprising, in combination:
   (A) a pickup head including
      (1) means establishing a magnetic field,
      (2) said pickup head being positioned to dispose said magnetic field in the path of travel of said objects;
   (B) a free-running oscillator periodically driving said means so as to develop said magnetic field; and
   (C) an oscillating circuit coupled to said magnetic field,
      (1) said circuit developing a sinusoidal signal in response to the driving of said means by said oscillator,
         (a) said sinusoidal signal being temporarily decreased in amplitude by the passage of a metallic object through said magnetic field;
   (D) amplifier means connected to amplify said sinusoidal signal, said amplifier means including
      (1) at least two cascaded transistor amplifying stages;
   (E) a demodulating capacitor connected to an output terminal of said amplifier means,
      (1) said capacitor functioning to hold the voltage appearing at said output terminal at a standby level, and to rapidly increase this voltage level in response to a temporary decrease in the amplitude of said sinusoidal signal caused by the proximity of a metallic object to said pickup head;
   (F) an automatic gain control circuit connected to said output terminal of said amplifier means and operating to control the gain of at least one of said amplifying stages, said gain control circuit including
      (1) delay means operating to render said gain control circuit effective to control the gain of said amplifier means so as to maintain said voltage level substantially constant at standby and ineffective to control the gain of said amplifier means in the event of temporary and rapid variations in said voltage level;
   (G) a pulse generator A.C. coupled to the output terminal of said amplifier means, said pulse generator including
      (1) a unijunction transistor fired by a temporary increase in said voltage level to generate an output pulse; and
   (H) pulse counting circuitry accumulating output pulses from said pulse generator.

6. The system defined in claim 5 wherein
   (F) (1) said delay means having
      (a) a resistor connected to said output terminal and
      (b) a series connected second capacitor,
   (2) said automatic gain control circuit further including an emitter follower transistor having
      (a) a base terminal connected to the junction between said second capacitor and said resistor, and
      (b) an emitter terminal connected to the input terminal of the initial amplifying stage of said amplifier means.

7. A system for detecting the proximity of metallic objects, said system comprising, in combination:
   (A) a pickup head including
      (1) a transformer having
         (a) primary and
         (b) secondary windings,
      (2) said pickup head being positioned adjacent the path of travel of said objects;
   (B) a free-running oscillator for periodically driving said primary transformer winding to develop a magnetic field linking said primary and secondary transformer windings;
   (C) a tank circuit formed by
      (1) a capacitor connected in circuit with said secondary transformer winding,
      (2) said tank circuit developing
         (a) a first sinusoidal signal at standby and
         (b) a second sinusiodal signal in response to the passage of a metallic object through said magnetic field;
   (D) amplifier means for amplifying said first and second sinusoidal signals;
   (E) a demodulating capacitor connected to an output terminal of said amplifier means; said capacitor
      (1) functioning to hold the voltage at said output terminal at a standby level in response to said first sinusoidal signal and to increase said voltage in response to said second sinusoidal signal;
   (F) an automatic gain control circuit connected to said output terminal of said amplifier means and operating to control the gain of said amplifier means so as to maintain said standby voltage level substantially constant;
   (G) a pulse generator A.C. coupled to said output terminal of said amplifier means, said pulse generator including
      (1) a unijunction transistor operating in response to a voltage rise at said output terminal to develop a controlled output pulse in response to each passage of an object through said magnetic field; and (H) pulse counting circuitry for accumulating controlled output pulses.

8. The system defined in claim 7 wherein said pulse generator includes (G)(1) said unijunction transistor having
    (a) a first base terminal,
    (b) a second base terminal, and
    (c) an emitter terminal,
(2) a first relay having
    (a) a coil and
    (b) contacts operatively associated with said coil,
(3) a diode,
(4) a variable voltage divider network connected across said first and second base terminals and establishing a second standby voltage level at a junction for application through said diode to said emitter terminal,
(5) a first series circuit connected to said junction, said first series circuit including
    (a) a first capacitor charging toward said second standby voltage level,
(6) a second series circuit connected to said junction, said second series circuit including
    (a) a second capacitor charging toward said second standby voltage level and
    (b) said first relay coil,
(7) whereby said first capacitor discharges on operation of said unijunction transistor to supply starting current to said unijunction transistor while said second capacitor discharges to supply sustaining current to said unijunction transistor and to energize said first relay coil, said first relay contacts closing to develop said output pulse.

9. The system defined in claim 8, and (I) output pulse stretching means connected between said pulse generator and said pulse counting circuitry, said stretching means including
(1) a second relay having
    (a) a coil initially energized by the closure of said first relay contacts and
    (b) contacts operating to close on energization of said second relay coil, and
(2) a capacitor connected in series with said second relay coil to temporarily continue the energization of second relay coil after said first relay contacts open,
(3) whereby closure of said second relay contacts develop a time stretched output pulse to said pulse counting circuitry.

10. A system for detecting the proximity of metallic objects, said system comprising, in combination:

(A) a pickup head including
(1) a transformer having
    (a) primary and
    (b) secondary windings,
    (c) said primary and secondary windings wound in overlying relationship on said pickup head,
(2) centrally disposed magnetic material focusing a magnetic field tightly linking said primary and secondary transformer windings
(3) said pickup head being positioned to dispose said magnetic field in the path of travel of said objects;
(B) a sawtooth oscillator for periodically driving said primary transformer winding to develop said magnetic field, said sawtooth oscillator including
(1) a unijunction transistor having
    (a) a first base terminal connected to said primary transformer windings
    (b) a second base terminal, and
    (c) an emitter terminal,
(2) a first resistor connected between said emitter terminal and a first junction,
(3) a second resistor connected from said first junction to said first base terminal, and
(4) a timing capacitor connected from said first junction to said second base terminal,
    (a) said timing capacitor being repetitively charged through said second resistor and discharged through said first resistor to repetitively fire said unijunction transistor thereby driving said primary transformer winding;
(C) a tank circuit formed by
(1) a capacitor connected in circuit with said secondary transformer winding,
(2) said tank circuit developing an oscillatory signal in response to the driving of said primary transformer winding,
    (a) a portion of said oscillatory signal being coupled back to said primary transformer winding to appear on said first base terminal so as to synchronize said oscillator to the frequency of said oscillatory signal;
    (b) said oscillatory signal having a first condition at standby and
    (c) a second signal condition resulting from the passage of a metallic object through said magnetic field;
(D) amplifier means for amplifying said oscillatory signal;
(E) a demodulating capacitor connected to an output terminal of said amplifier means; said capacitor
(1) functioning to hold the voltage at said output terminal at a first standby level in response to first condition of said oscillatory signal and to increase said voltage in response to the second condition of said oscillatory signal;
(F) an automatic gain control circuit connected to said output terminal of said amplifier means and operating to control the gain of said amplifier means so as to maintain said first standby voltage level substantially constant;
(G) a pluse generator A.C. coupled to said output terminal of said amplifier means, said pulse generator including
(1) a unijunction transistor having
    (a) a first base terminal,
    (b) a second base terminal, and
    (c) an emitter terminal,
(2) a first relay having
    (a) a coil and
    (b) contacts operatively associated with said coil
(3) a diode,
(4) a variable voltage divider network connected across said first and second base terminals and establishing a second standby voltage level at a second junction for application through said diode to said emitter terminal,
(5) a first series circuit connected to said junction, said first series circuit including
    (a) a first capacitor charging toward said second standby voltage level,
(6) a second series circuit connected to said junction, said second series circuit including
    (a) a second capacitor charging toward said second standby voltage level and
    (b) said first relay coil
(7) whereby said unijunction transistor operates in response to said voltage increase at said output terminal to discharge said first and second capacitors, said first capacitor supplying starting current to said unijunction transistor while said second capacitor supplies sustaining current to said unijunction transistor and simultaneously energizes said first relay coil, said first relay contacts closing to develop an output pulse;
(H) output pulse stretching means connected to said pulse generator, said stretching means including
    (1) a second relay having
        (a) a coil initially energized by the closure of said first relay contacts and
        (b) contacts operating to close on energization of said second relay coil,
    (2) a capacitor connected in series with said second relay coil to temporarily continue the energization of second relay coil after said first relay contacts open,
    (3) whereby closure of said second relay contacts develop a time stretched output pulse; and
(I) pulse counting circuitry accumulating time stretched output pulses to provide an accounting of the number of objects passing through said magnetic field.

11. The system defined in claim 10 wherein said oscillatory signal is sinusoidal in wave form and said second condition of said oscillatory signal is characterized by a general decrease in amplitude relative to said first condition.

12. A proximity detector of metallic objects comprising, in combination:
(A) a pickup head including
    (1) a transformer having
        (a) primary and
        (b) secondary windings, and
    (2) magnetic material for focusing a magnetic field linking said primary and secondary windings,
    (3) said pickup head being positioned to dispose said magnetic field in the path of travel of said objects;
(B) a free-running oscillator developing periodic energizing pulses for said primary winding to develop said magnetic field; and
(C) a tank circuit formed by
    (1) a capacitor connected in circuit with said secondary winding,
    (2) said tank circuit developing an oscillatory signal in response to said periodic pulses,
        (a) said oscillator connected to said primary winding to receive a portion of said oscillatory signal as coupled back from said secondary winding to said primary winding,
        (b) said oscillator thereby synchronized to the oscillatory signal frequency such that each said energizing pulse reinforces said oscillatory signal; and
(D) output means connected to said secondary winding and operating in response to abrupt variations in the amplitude of said oscillatory signal to indicate the proximity of said objects.

References Cited
UNITED STATES PATENTS

| | | | |
|---|---|---|---|
| 2,267,884 | 12/1941 | Zuschlag | 324—40 |
| 2,660,704 | 11/1953 | Harmon et al. | 324—340 |
| 3,020,472 | 2/1962 | Cauley | 324—34 |

FOREIGN PATENTS

| | | |
|---|---|---|
| 607,683 | 9/1948 | Great Britain. |

WALTER L. CARLSON, *Primary Examiner.*

RICHARD B. WILKINSON, *Examiner.*

R. J. CORCORAN, *Assistant Examiner.*